1,008,666. TOP ATTACHMENT FOR AUTOMOBILES. JOHN C. MUNDAY, Dayton, Ohio. Filed June 4, 1910. Serial No. 564,966.

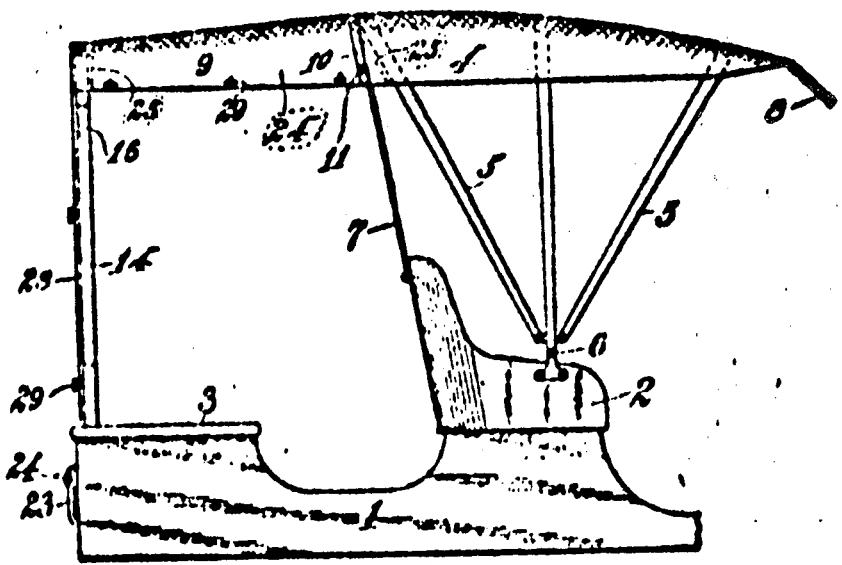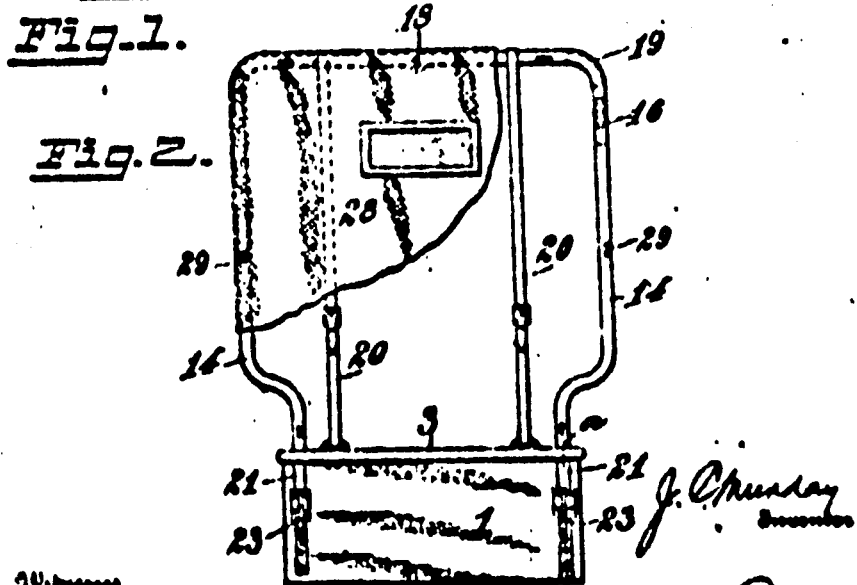

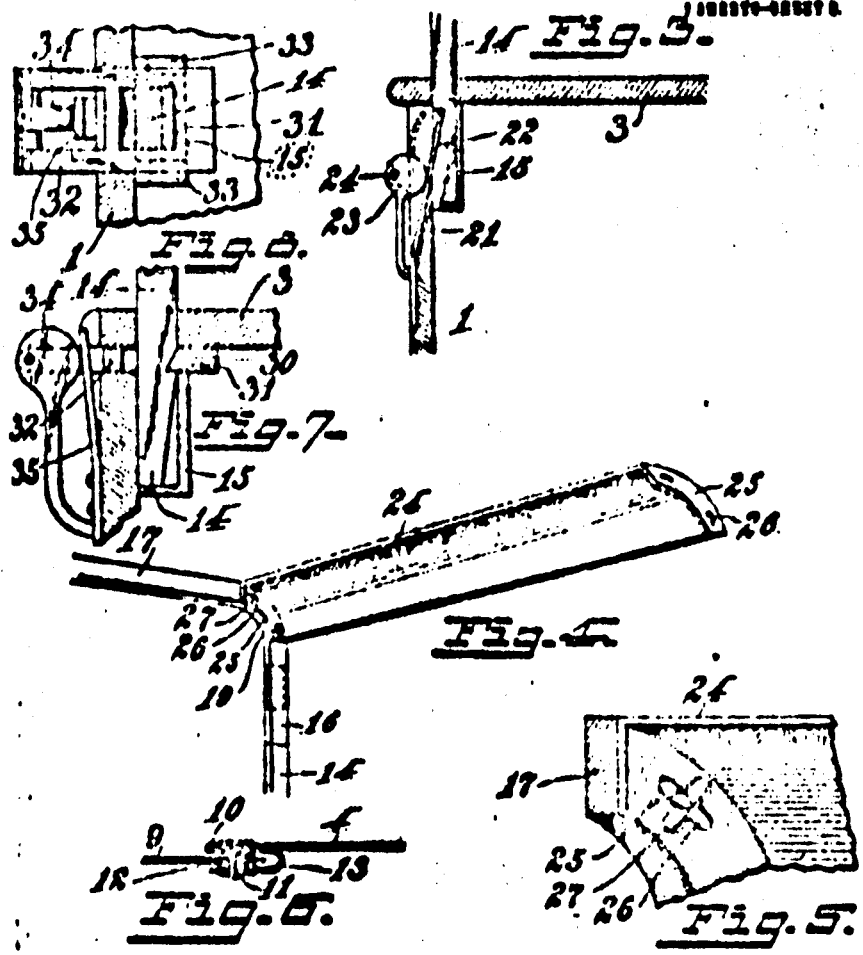

To all whom it may concern:

Be it known that I, JOHN C. MUNDAY, a citizen of the United States, residing at Dayton, R. F. D. No. 12, in the county of Montgomery and State of Ohio, have invented certain new and useful Improvements in Top Attachments for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements for canopy or top attachments for automobiles.

The object of the invention is to provide an attachment for the rear seat or tonneau of an automobile having the special features hereinafter described and pointed out in the claim, that may be attached to the canopy over the forward seat and thus constitute a continuous top, or folded in a compact space when not in use.

Referring to the drawings, Figure 1 is a side elevation of the body portion of an automobile equipped with my invention. Fig. 2 is a rear elevation of the same. Fig. 3 is a section on the line a—a of Fig. 2. Fig. 4 is a perspective view of a portion of the frame. Fig. 5 is a perspective view showing the method of holding the various parts of the frame together. Fig. 6 is a detail view showing the snap connection that holds the front and rear canopy covers together. Fig. 7 is a sectional detail view of a modified form of the holding means shown in Fig. 3; and Fig. 8 is a top plan view of the same with the seat removed.

In the drawings 1 represents the body of an automobile provided with a front seat 2 and a rear seat 3. Mounted over the front seat is a canopy or top 4 supported on a folding frame 5 pivoted to the seat at 6 in a well known manner. The canopy 4 is held in position by rear straps 7 and forward straps 8 which are well known means in automobile work. One only of the flexible connections 7 is shown in Fig. 1, but it will be understood that there is one on each side extending from the joint between the two canopy tops to a convenient part of the body, for example, the back of the seat. These connections not being of a rigid character, permit of a certain amount of vibration, which is unavoidable at a joint between two canopy tops formed of fabric or foldable material, and yet such support is sufficient to relieve the joint of too much strain. Extending rearwardly from the front canopy 4 and over the rear seat 3 is a flexible canopy or top 9 attached to the forward flexible canopy 4 at 10. The particular construction of this attachment is shown in Fig. 6. The forward canopy 4 is provided with snaps 11, which pass through gromets 12 in the canopy 9 and with flaps 13. This arrangement effectually prevents the rain entering between the forward and rearward canopies, as the two canopies practically form a continuous top. The rear canopy 9 is supported by a framework as follows. Extending upwardly from the rear seat 3 are uprights 14 that rest in sockets 15. The upper ends of said uprights 14 have telescopic connections 16 which receive the downwardly projecting ends of an arch piece 17. The arch piece 17 is hinged at 18 and is provided with curved portions 19 which give the rear canopy 9 the proper shape. The hinge 18 and the telescopic connections 19 allow the rear frame-work to be folded and placed in a compact space. The rear frame is held in the sockets 15 by straps 20 and by springs 21 which enter recesses 22 in the lower ends of the rods 14. The springs 21 are controlled by eccentrics 23 pivoted at 24. When it is desired to remove the rods 14, the eccentrics 23 are thrown outwardly, thus releasing the springs 21. When the springs 21 rest in the recesses 22, said springs prevent the rods 14 rattling in their sockets 15.

In Figs. 7 and 8 I have shown a modified form of holding means for the lower ends of the rods 14. In this modification the rods 14 are provided with angular recesses 30 adapted to receive the wedge piece 31 which is part of a frame 32. The frame 32 slides in suitable guides 33 and is controlled by an eccentric 34. The eccentric 34 rests against a spring 35 which holds the wedge piece 31 firmly in the recess 30. When the eccentric 34 is thrown downward, the rod 14 may be detached through the frame 32, as said frame may then be pushed inwardly.

The arch piece 17 is connected to the forward frames 5 by members 24 which may be curved to conform with the curvature of the canopy 9. These members 24 are provided with flanges 25 having elongated orifices 26. The orifices 26 are adapted to receive thumb pieces 27 on the arch strip 17 and the frame 5, as is shown in detail in Fig. 5. When it is desired to release the members 24, the thumb pieces 27 are turned parallel with the orifices 26 which allows the thumb piece to pass through the orifice. The canopy 9 and the rear curtain 28 are attached to the rear frame-work by thumb pieces 29 similar to the thumb pieces 27, the orifices 26 being in the canopy and curtain.

I claim:

The combination with an automobile body having front and rear seats and a permanent foldable canopy top over the front seat, of a flexible rear canopy top having a frame detachably connected to the rear portion of said body and carried forward and detachably connected to the rear end of said front canopy top, and flexible connections extended from the joint formed between the two canopy tops to a suitable part of the body, substantially as specified.

In testimony whereof I affix my signature, in presence of two witnesses.

JOHN C. MUNDAY.

Witnesses:
R. J. McCarty,
Howard S. Smith.